United States Patent [19]

Kiyomoto et al.

[11] Patent Number: 5,205,862

[45] Date of Patent: Apr. 27, 1993

[54] WATER RESISTANT INK COMPOSITIONS AND PROCESS FOR PREPARATION

[75] Inventors: Hiroshi Kiyomoto; Yasuyuki Sugimoto, both of Hiratsuka, Japan

[73] Assignee: Kabushiki Kaisha Pilot, Tokyo, Japan

[21] Appl. No.: 844,877

[22] Filed: Mar. 3, 1992

Related U.S. Application Data

[63] Continuation of Ser. No. 599,902, Oct. 19, 1990, abandoned.

[30] Foreign Application Priority Data

Oct. 26, 1989 [JP] Japan .................................. 1-277313

[51] Int. Cl.$^5$ .............................................. C09D 11/00
[52] U.S. Cl. .................................. 106/22 R; 106/22 H
[58] Field of Search ...................................... 106/20-23

[56] References Cited

U.S. PATENT DOCUMENTS

| | | | |
|---|---|---|---|
| 4,325,735 | 4/1982 | Ohta et al. | 106/22 |
| 4,343,620 | 8/1982 | Abel et al. | 8/557 |
| 4,559,162 | 12/1985 | Abel et al. | 252/321 |
| 4,702,743 | 10/1987 | O'Callaghan et al. | 8/527 |

Primary Examiner—Mark L. Bell
Assistant Examiner—Margaret Einsmann
Attorney, Agent, or Firm—Beveridge, DeGrandi, Weilacher & Young

[57] ABSTRACT

A water-resistant ink composition containing water, an anionic dye and a water-resistance modifier which contains as an effective component a sparingly water-soluble compound comprising at least one oleophilic group selected from the group consisting of an aromatic ring and an aliphatic hydrocarbon having 6–12 carbon atoms, and at least one hydrophilic group having at least one of O, N and S atoms.

11 Claims, No Drawings

WATER RESISTANT INK COMPOSITIONS AND PROCESS FOR PREPARATION

This application is a continuation of application Ser. No. 07/599,902, filed Oct. 19, 1990, now abandoned.

INTRODUCTION AND BACKGROUND

The present invention relates to an aqueous ink composition, more particularly an aqueous ink composition which has excellent water resistance on paper and aging resistance as inks for writing tools, plotter pens or ink jet printers.

A variety of investigations and developments have been hitherto carried out for the purpose of affording water resistance on paper to written matter. Pigment type aqueous inks containing pigments are popular, but these inks lack stability when in the form of a dispersion and exhibit problems of aging resistance manifested by sedimentation of the pigment particles.

The present inventors have conducted research on the so-called aqueous ink compositions using a water soluble dye which has excellent aging resistance as compared with pigments and have excellent water-resistance on paper.

The present inventors have discovered that an anionic dye ink to which has been added a sparingly water-soluble compound containing at least one oleophilic group selected from an aromatic ring or an aliphatic hydrocarbon having 6-12 carbon atoms and at least one hydrophilic group selected from a group having at least one atom such as O, N or S remarkably improves the water resistance on paper.

However, the aforementioned compound is sparingly soluble in water, so that only a dispersion type ink can be obtained. On the other hand, the present inventors have found that among the aforementioned compounds, the compounds having a solubility of 5% by weight or more in ethanol at 20° C. are preferred as they are solubilized very easily with an anionic dye having a surface tension in the range of 60 dyn/cm or less at 20° C. measured as a 0.1% by weight aqueous solution.

Applicants have discovered an aqueous ink which has excellent aging resistance and has an excellent water-resistance on paper.

SUMMARY OF THE INVENTION

The present invention resides in a water-resistant ink composition comprising:
(a) water,
(b) an anionic dye, and
(c) a water-resistance modifier which contains as an effective component a sparingly water-soluble compound comprising at least one oleophilic group selected from the group consisting of an aromatic ring and an aliphatic hydrocarbon having 6-12 carbon atoms, and at least one hydrophilic group having at least one of O, N and S atoms.

In a further aspect of the invention, the water-resistant ink composition contains an anionic dye having a surface tension in the range of 60 dyn/cm or less at 20° C. measured as a 0.1% by weight aqueous solution.

The water-resistance modifier preferably comprises an effective amount of a sparingly water-soluble compound which contains at least one oleophilic group selected from an aromatic ring or an aliphatic hydrocarbon having 6-12 carbon atoms and at least one hydrophilic group having at least one of O, N and S atoms and which has a solubility of 5% by weight or more in ethanol at 20° C.

In a more detailed aspect, the sparingly water-soluble compound can be one or more of the compounds selected from the group consisting of
(a) a compound having a dicarboxylate structure,
(b) a compound having a benzophenone structure,
(c) a compound having a phenol structure,
(d) a compound having an imidazole structure,
(e) a compound having a benzothiazol structure,
(f) a compound having a benzoin structure, and
(g) a compound having a benzoate structure.

It is advantageous for the water-resistant ink compositions according to the invention to have incorporated therein one or more dry-up resistance imparting agents such as an alcohol, an amine, a urea compound, 2-pyrrolidone, polyvinyl pyrrolidone, sorbitol and dimethylsulfone.

The urea compound suitable for purposes of the invention include one or more selected from urea, thiourea, ethylene urea, hydroxypropylurea, hydroxyethylurea, ethylene thiourea and diethylthiourea.

Another aspect of the invention resides in a process for preparing a water-resistant ink composition comprising blending together
(a) water,
(b) an anionic dye having a surface extension of 60 dyn/cm or less at 20° C. measured as a 0.1% by weight solution in water, and
(c) a water-resistance modifier which contains an effective amount of a sparingly water-soluble compound comprising at least one oleophilic group selected from an aromatic ring or an aliphatic hydrocarbon having 6-12 carbon atoms and at least one hydrophilic group having at least one of O, N and S atoms,
to thereby form a solution. The aliphatic hydrocarbon group preferably includes an alkylene group.

In carrying out the process, the step of forming a solution is conducted at a temperature not lower than room temperature.

DETAILED DESCRIPTION OF THE INVENTION

Although applicants do not wish to be bound by any theory, the improvement of the water-resistance on paper is believed to be due to the following assumption. A sparingly water-soluble compound containing at least one hydrophilic group which has at least one highly electronegative atom such as O, N or S will form hydrogen bonds between paper and a dye and between the sparingly water-soluble compound and paper which are stronger than the conventional hydrogen bond between paper and a dye and will further improve the water-resistance on paper because of the hydrophobic properties of the sparingly water-soluble compound.

It is also believed that an anionic dye having a surface tension of 60 dyn/cm or less at 20° C. measured as a 0.1% by weight aqueous solution will form a micell which solubilizes the sparingly water-soluble compound.

In this connection, a compound having a solubility of 5% by weight or more in ethyl alcohol among the sparingly water-soluble compounds is preferably solubilized.

The anionic dyes used according to the present invention and having a surface tension of 60 dyn/cm or less at 20° C. measured as a 0.1% by weight aqueous solution include: Acid dyes:

C.I. Acid Yellow 40,
C.I. Acid Orange 51,
C.I. Acid Red 114 and 249,
C.I. Acid Blue 83, 90, 103 and 127,
C.I. Acid Green 25 and 27;

Direct dyes

C.I. Direct Black 154, and
Epoxydized C.I. Direct Black 154.

The aforementioned dyes may be used alone or as a combination of the two or more.

The sparingly water-soluble compound used according to the present invention and comprising at least one oleophilic group selected from an aromatic ring or an aliphatic hydrocarbon having 6–12 carbon atoms and at least one hydrophilic group selected from the groups having at least one of O, N and S atoms includes one or more of the compounds selected from the group consisting of:

(a) a compound having a dicarboxylate structure,
(b) a compound having a benzophenone structure,
(c) a compound having a phenol structure,
(d) a compound having an imidazole structure,
(e) a compound having a benzothiazole structure,
(f) a compound having a benzoin structure, and
(g) a compound having a benzoate structure. The compounds having a solubility of 5% by weight or more in ethyl alcohol at 20° C. are preferred.

Specific examples of the compound (a) include diethyl sebacate, bis(2,2,6,6-tetramethyl-4-piperidyl) sebacate, bis(1,2,2,6,6-pentamethyl-4-piperidyl) sebacate or the like.

Specific examples of the compound (b) include benzophenone, 2,2'-dihydroxy-4-methoxybenzophenone, 2,4-dihydroxy-benzophenone or the like.

Specific examples of the compound (c) include ethyl 2,2-bis(4'-hydroxyphenyl)propane gallate, n-propyl gallate, isoamyl gallate salicylic aidoxime, diethyl 4-hydroxy-1,2-phthalate, para-tert-butylphenol or the like.

Specific examples of the compound (d) include benzimidazole or the like.

Specific examples of the compound (e) include 2-chloro-benzothiazole, 2-methyl-5-chlorobenzothiazole, 2-mercaptobenzothiazole or the like.

Specific examples of the compound (f) include benzoin methyl ether or the like.

Specific examples of the compound (g) include propyl p-hydroxybenzoate, phenyl benzoate or the like.

The compounds described above may be used alone or as a combination of the two or more.

The ink according to the present invention contains water as a solvent component. When the following materials are incorporated for the purpose of preventing the drying of the ink, improving the solubility of dyes, the resistance to drying-up of the ink is improved: ethylene glycol, diethylene glycol, triethylene glycol, propylene glycol, dipropylene glycol, glycerol, polyglycerol, polyethylene glycol, polypropylene glycol, methyl cellosolve, ethyl cellosolve, butyl cellosolve, methyl carbitol, ethyl carbitol, butyl carbitol, propylene glycol methyl ether, dipropylene glycol methyl ether, tripropylene glycol methyl ether, 3-methyl-3-methoxybutanol, 2-pyrrolidone, triethanolamine, urea and derivatives thereof.

The urea derivatives include thiourea, ethylene urea, hydroxyethylurea, hydroxypropylurea, ethylene thiourea, diethyl thiourea and the like.

These derivatives may be used alone or as a combination of the two or more.

The ink according to the present invention can appropriately contain, in addition to the above-described components, additives, for example preservatives such as methyl p-hydroxybenzoate or 1,2-benzisothiazolin-3-one;

rust preventives such as benzotriazole or diethylamine butoxyethyl acid phosphate;

viscosity modifiers such as water-soluble resins including polyvinyl pyrrolidone, polyvinyl alcohol, cellulose derivatives or maleic acid derivatives;

surface tension modifiers such as surfactants or the like; or retention modifiers such as polymer emulsions for improving the retention of ink in a non-permeable support such as polyester films or the like, provided that they do not impair the properties of the ink.

Next, referring to the process for preparing a water-soluble ink according to the present invention briefly, it s sufficient that an anionic dye is completely dissolved in water and a sparingly water-soluble compound is then added to form a solution.

The solution is preferably formed with stirring at room temperature or higher, particularly at 80° C. or above.

After the sparingly water-soluble compound is completely solubilized, other components are added and the mixture is stirred to form a solution of ink.

EXAMPLE

The present invention is further explained with reference to Examples and Comparative Examples.

EXAMPLE 1

| | |
|---|---|
| C.I. Acid Blue 90 (surface tenson: 52.3 dyn/cm) | 5.0% by weight |
| 2,2'-Dihydroxy-4-methoxybenzophenone (solubility in ethyl alcohol: 5% by weight or more) | 2.0 |
| Demineralized water | 71.0 |
| Ethylene glycol | 10.0 |
| Diethylene glycol | 10.0 |
| Triethanolamine | 1.0 |
| PROXEL XL-2 | 1.0 |
| | 100.0 |

Procedure: After Acid Blue 90 was completely dissolved in demineralized water at 60° C. by stirring, 2,2'-dihydroxy-4-methoxybenzophenone was added to the solution and the mixture was stirred with heating at 80° C. for 1 hour. The remaining components are added, and the mixture was stirred at room temperature for 1 hour and filtered to give a blue ink.

EXAMPLE 2

| | |
|---|---|
| C.I. Acid Blue 90 | 5.0% by weight |
| 2,2'Bis(4'-hydroxyphenyl)propane (solubility: 5% by weight or more) | 1.0 |
| Demineralized water | 68.0 |
| Ethylene glycol | 8.0 |
| Diethylene glycol | 8.0 |
| Glycerol | 4.0 |
| Urea | 5.0 |
| PROXEL XL-2* | 1.0 |
| | 100.0 |

*Propylene glycol water solution (10%) of 1,2-benzisothiazolin-3-one (ICI PLC)

Following the procedure described in Example 1, a blue ink was prepared.

EXAMPLE 3

| C.I. Acid Blue 90 | 5.0% by weight |
| --- | --- |
| Benzimidazole (solubility: 5% by weight or more) | 2.0 |
| Demineralized water | 71.0 |
| Polyethylene glycol #200 | 20.0 |
| PROXEL XL-2 | 1.0 |
| Triethanolamine | 1.0 |
| | 100.0 |

Following the procedure described in Example 1, a blue ink was prepared.

EXAMPLE 4

| C.I. Acid Blue 90 | 5.0% by weight |
| --- | --- |
| 4-Hydroxy-1,2-phthalic acid diethyl ester (solubility: 5% by weight or more) | 1.0 |
| Demineralized water | 72.0 |
| Polyethylene glycol #300 | 15.0 |
| Glycerol | 5.0 |
| Triethanolamine | 1.0 |
| PROXEL XL-2 | 1.0 |
| | 100.0 |

Following the procedure described in Example 1, a blue ink was prepared.

EXAMPLE 5

| C.I. Acid Blue 90 | 5.0% by weight |
| --- | --- |
| Benzoin methyl ether (solubility: 5% by weight or more) | 1.0 |
| Demineralized water | 72.0 |
| Ethylene glycol | 10.0 |
| Diethylene glycol | 10.0 |
| Triethanolamine | 1.0 |
| PROXEL XL-2 | 1.0 |
| | 100.0 |

Following the procedure described in Example 1, a blue ink was prepared.

EXAMPLE 6

| C.I. Acid Blue 90 | 5.0% by weight |
| --- | --- |
| 2-Chlorobenzothiazole (solubility: 5% by weight or more) | 1.0 |
| Demineralized water | 72.0 |
| Ethylene glycol | 10.0 |
| Diethylene glycol | 10.0 |
| Triethanolamine | 1.0 |
| PROXEL XL-2 | 1.0 |
| | 100.0 |

Following the procedure described in Example 1, a blue ink was prepared.

In Examples 1–6, the addition of various kinds of glycols were intended to increase the solubility of dyes and the wettability of inks and to improve the resistance to drying-up. However, this addition did not result in the solubilization of the water-resistance imparting agent.

EXAMPLE 7

| C.I. Acid Blue 90 | 5.0% by weight |
| --- | --- |
| 2,2'-Dihydroxy-4-methoxybenzophenone | 2.0 |
| Demineralized water | 93.0 |
| | 100.0 |

Procedure: After Acid Blue 90 was completely dissolved in demineralized water by stirring at 60° C., 2,2'-dihydroxy-4-methoxybenzophenone was added and the mixture was stirred with heating at 80° C. for 1 hour. After the mixture was left standing, it was filtered to give a blue ink.

While the preparation of the blue inks has been described in Examples 1–7, inks of different colors can be prepared by altering the dyes in the process according to the present invention.

EXAMPLE 8

| C.I. Direct Black 154 (surface tension: 55.1 dyn/cm) | 7.5% by weight |
| --- | --- |
| Bis(2,2,6,6-tetramethyl-4-piperidyl) sebacate (solubility: 5% by weight or more) | 2.0 |
| Demineralized water | 66.5 |
| Ethylene glycol | 10.0 |
| Diethylene glycol | 10.0 |
| Triethanolamine | 3.0 |
| PROXEL XL-2 | 1.0 |
| | 100.0 |

Procedure: After Direct Black 154 was completely dissolved in demineralized water at 60° C. by stirring, bis(2,2,6,6-tetramethyl-4-piperidyl) sebacate was added and the mixture was stirred with heating at 80° C. for 2 hours. Next, the remaining components were added, and the mixture was stirred at room temperature for 1 hour, cooled by leaving it standing and filtered to give a black ink.

EXAMPLE 9

| C.I. Acid Yellow 40 (surface tension: 37.4 dyn/cm) | 5.0% by weight |
| --- | --- |
| Benzoin methyl ether | 1.0 |
| Ethylene glycol | 10.0 |
| Diethylene glycol | 10.0 |
| Triethanolamine | 1.0 |
| PROXEL XL-2 | 1.0 |
| Demineralized water | 72.0 |
| | 100.0 |

Procedure: After Acid Yellow 40 was completely dissolved in demineralized water at 60° C. by stirring, benzoin methyl ether was added and the mixture was stirred with heating at 80° C. for 1 hour. Next, the remaining components were added, and the mixture was stirred at room temperature for 1 hour, cooled by leaving it standing and filtered to give a yellow ink.

In the ink according to the present invention, two or more kinds of dyes can be used as a mixture.

EXAMPLE 10

| C.I. Acid Red 114 (surface tension: 54.4 dyn/cm) | 1.5% by weight |
| --- | --- |
| C.I. Acid Yellow 40 | 1.5 |
| Bis(2,2,6,6-tetramethyl-4-piperidyl) | 0.4 |

| | |
|---|---|
| sebacate | |
| Ethylene glycol | 10.0 |
| Diethylene glycol | 10.0 |
| Triethanolamine | 1.0 |
| PROXEL XL-2 | 1.0 |
| Demineralized water | 74.6 |
| | 100.0 |

Procedure: After Acid Red 114 and Acid Yellow 40 were completely dissolved in demineralized water at 60° C. by stirring, bis(2,2,6,6-tetramethyl-4-piperidyl) sebacate was added and the mixture was stirred with heating at 80° C. for 1 hour. Next, the remaining components were added, and the mixture was stirred at room temperature for 1 hour, cooled by leaving it standing and filtered to give an orange ink.

In the ink according to the present invention, two or more kinds of dyes can be used as a mixture.

EXAMPLE 11

| | |
|---|---|
| C.I. Acid Blue 90 | 5.0% by weight |
| p-tert-Butylphenol (solubility: 5% by weight or more) | 0.5 |
| Propyl p-hydroxy-benzoate (solubility: 5% by weight or more) | 0.5 |
| Polyethylene glycol #200 | 20.0 |
| PROXEL XL-2 | 1.0 |
| Triethanolamine | 1.0 |
| Demineralized water | 72.0 |
| | 100.0 |

Procedure: After Acid Blue 90 was completely dissolved in demineralized water at 60° C. by stirring, p-tert-butylphenol and propyl p-hydroxybenzoate were added and the mixture was stirred with heating at 80° C. for 1 hour. Next, the remaining components were added, and the mixture was stirred at room temperature for 1 hour, cooled by leaving it standing and filtered to give a blue ink.

COMPARATIVE EXAMPLE 1 (WITHOUT A WATER-RESISTANCE IMPARTING AGENT)

| | |
|---|---|
| C.I. Acid Blue 90 | 5.0% by weight |
| Demineralized water | 73.0 |
| Polyethylene glycol #200 | 20.0 |
| Triethanolamine | 1.0 |
| PROXEL XL-2 | 1.0 |
| | 100.0 |

Procedure: The first two components (Acid Blue 90 and demineralized water) were stirred with heating at 80° C. for 1 hour. Next, the remaining components were added, and the mixture was stirred at room temperature for 1 hour and filtered to give a blue ink.

COMPARATIVE EXAMPLE 2 (WITHOUT A WATER-RESISTANCE IMPARTING AGENT)

| | |
|---|---|
| C.I. Acid Yellow 40 | 5.0% by weight |
| Ethylene glycol | 10.0 |
| Diethylene glycol | 10.0 |
| Triethanolamine | 1.0 |

| | |
|---|---|
| PROXEL XL-2 | 1.0 |
| Demineralized water | 73.0 |
| | 100.0 |

Procedure: The first two components were stirred with heating at 80° C. for 1 hour. After cooling the mixture by leaving it standing, it is filtered to give a blue ink.

COMPARATIVE EXAMPLE 3 (WITHOUT A WATER-RESISTANCE IMPARTING AGENT)

| | |
|---|---|
| C.I. Direct Black 154 | 7.5% by weight |
| Demineralized water | 68.5 |
| Ethylene glycol | 10.0 |
| Diethylene glycol | 10.0 |
| Triethanolamine | 3.0 |
| PROXEL XL-2 | 1.0 |
| | 100.0 |

Procedure: The first two components (Direct Black 154 and demineralized water) were stirred with heating at 80° C. for 2 hours. Next, the remaining components were added, and the mixture was stirred at room temperature for 1 hour and filtered to give a black ink.

COMPARATIVE EXAMPLE 4 (WITH A DYE HAVING A SURFACE TENSION OF EXCEEDING 60 dyn/cm)

| | |
|---|---|
| C.I. Direct Blue 87 (surface tension: 68.4 dyn/cm) | 5.0% by weight |
| 2,2'-Dihydroxy-4-methoxybenzophenone | 2.0 |
| Demineralized water | 71.0 |
| Ethylene glycol | 10.0 |
| Diethylene glycol | 10.0 |
| Triethanolamine | 1.0 |
| Proxel XL-2 | 1.0 |
| | 100.0 |

Following the procedure described in Example 1, a blue ink was obtained.

COMPARATIVE EXAMPLE 5 (WITH A WATER-RESISTANCE IMPARTING AGENT HAVING A SOLUBILITY IN ETHANOL OF LESS THAN 5% BY WEIGHT)

| | |
|---|---|
| C.I. Acid Blue 90 | 5.0% by weight |
| 8-Benzyl-7,7,9,9-tetramethyl-3-octyl-1,3,8-triazaspiro[4,5]-undecane-2,4-dione (solubility: less than 5% by weight) | 2.0 |
| Demineralized water | 71.0 |
| Ethylene glycol | 10.0 |
| Diethylene glycol | 10.0 |
| Triethanolamine | 1.0 |
| PROXEL XL-2 | 1.0 |
| | 100.0 |

Following the procedure described in Example 1, a blue ink was obtained.

The composition of Examples and Comparative Examples are shown in Tables 1 and 2.

TABLE 1

| | Example 1 | 2 | 3 | 4 | 5 | 6 | 7 | 8 | 9 | 10 | 11 |
|---|---|---|---|---|---|---|---|---|---|---|---|
| Acid Blue 90 (Surface tension: 52.3 dyn/cm) | 5.0 | 5.0 | 5.0 | 5.0 | 5.0 | 5.0 | 5.0 | | | | 5.0 |
| Direct Black 154 (Surface tension: 55.1 dyn/cm) | | | | | | | | 7.5 | | | |
| Acid Yellow 40 (Surface tension: 37.4 dyn/cm) | | | | | | | | | 5.0 | 1.5 | |
| Acid Red 114 (Surface tension: 54.4 dyn/cm) | | | | | | | | | | 1.5 | |
| 2,2'-Dihydroxy-4-methoxy-benzophenone (Solubility: 5% by weight or more) | 2.0 | | | | | | 2.0 | | | | |
| 2,2-Bis(4'-hydroxyphenyl)-propane (Solubility: 5% by weight or more) | | 1.0 | | | | | | | | | |
| Benzimidazole (Solubility: 5% by weight or more) | | | 2.0 | | | | | | | | |
| 4-Hydroxy-1,2-phthalic acid diethyl ester (Solubility: 5% by weight or more) | | | | 1.0 | | | | | | | |
| Benzoin methyl ether (Solubility: 5% by weight or more) | | | | | 1.0 | | | | | | |
| 2-Chlorothiazole (Solubility: 5% by weight or more) | | | | | | 1.0 | | | | | |
| Bis(2,2,6,6-tetramethyl-4-piperidyl) sebacate (Solubility: 5% by weight or more) | | | | | | | | 2.0 | | 0.4 | |
| p-tert-Butylphenol (Solubility: 5% by weight or more) | | | | | | | | | | | 0.5 |
| Propyl p-hydroxybenzoate (Solubility: 5% or more) | | | | | | | | | | | 0.5 |
| Ethylene glycol | 10.0 | 8.0 | | | 10.0 | 10.0 | | 10.0 | 10.0 | 10.0 | |
| Diethylene glycol | 10.0 | 8.0 | | 5.0 | 10.0 | 10.0 | | 10.0 | 10.0 | 10.0 | |
| Glycerol | | 4.0 | | 5.0 | | | | | | | |
| Polyethylene glycol #200 | | | 20.0 | | | | | | | | 20.0 |
| Polyethylene glycol #300 | | | | 15.0 | | | | | | | |
| Urea | | 5.0 | | | | | | | | | |
| Triethanolamine | 1.0 | | 1.0 | 1.0 | 1.0 | 1.0 | | 3.0 | 1.0 | 1.0 | 1.0 |
| PROXEL XL-2 (Antiseptic agent) | 1.0 | 1.0 | 1.0 | 1.0 | 1.0 | 1.0 | | 1.0 | 1.0 | 1.0 | 1.0 |
| Demineralized water | balance | balance | balance | balance | balance | balance | balance | balance | balance | balance | balance |

Note
1: Surface tension is expressed as a value for a 0.1% by weight solution of a dye in demineralized water.
2: Solubility is expressed as a value in ethyl alcohol (20° C.).

TABLE 2

| | Comparative Example 1 | 2 | 3 | 4 | 5 |
|---|---|---|---|---|---|
| Acid Blue 90 (Surface tension: 52.3 dyn/cm) | 5.0 | | | | 5.0 |
| Direct Black 154 (Surface tension: 55.1 dyn/cm) | | | 7.5 | | |
| Acid Yellow 40 (Surface tension: 37.4 dyn/cm) | | 5.0 | | | |
| Direct Blue 87 (Surface tension: 68.4 dyn/cm) | | | | 5.0 | |
| 2,2'-Dihydroxy-4-methoxybenzophenone (Solubility: 5% by weight or more) | | | | 2.0 | |
| 8-Benzyl-7,7,9,9-tetramethyl-3-octyl-1,3,8-triazaspiro[4,5]undecane-2,4-dione (Solubility: less than 5% by weight) | | | | | 2.0 |
| Ethylene glycol | | 10.0 | 10.0 | 10.0 | 10.0 |
| Diethylene glycol | | 10.0 | 10.0 | 10.0 | 10.0 |
| Polyethylene glycol #200 | 20.0 | | | | |
| Triethanolamine | 1.0 | 1.0 | 3.0 | 1.0 | 1.0 |
| PROXEL XL-2 (Antiseptic agent) | 1.0 | 1.0 | 1.0 | 1.0 | 1.0 |
| Demineralized water | balance | balance | balance | balance | balance |

Note
1: Surface tension is expressed as a value for a 0.1% by weight solution of a dye in demineralized water
2: Solubility is expressed as a value in ethyl alcohol (20° C.).

Comparison Test

The ink compositions prepared in Examples and Comparative Examples were tested with reference to their aging resistance and water-resistance on paper. The results are shown in Table 3.

Testing Method

Water-resistance on paper

The blotting of ink and the staining of writing paper were observed upon dipping of a paper which had been just written in ink for a period of 1 minute.

⊚ No blotting of ink or no staining of paper,
○ A little blotting of ink and no staining of paper,
Δ Much blotting of ink and staining of paper, and
X Little trace of written matter.

Aging resistance

Physical properties were measured upon leaving standing of the inks at 50° C. for 60 days and compared with those before aging.

The deposition of dyes or water-resistance imparting agent was observed with an optical microscope (magnification: ×100).

Evaluation of observations

⊚ Little variation of physical properties before and after aging,
○ A little variation of physical properties before and after aging, and no deposition,
X Large variation of physical properties before and after aging accompanied with deposition.

Viscosity: measured at 20° C. with a B type viscometer (TOKYO KEIKI).

pH: measured with a pH meter (TOA DENPA KOGYO).

Surface tension: measured with KYOWA KAIMEN KAGAKU surface tensiometer Model CBUPA-3 at 20° C. hour.

TABLE 3

| | | Evaluaton in Examples and Comparative Examples | | | | | | |
|---|---|---|---|---|---|---|---|---|
| | Water- | Physical properties before aging | | | Physical properties after aging at 50° C. for 60 days | | | |
| Sample | resistance on paper | Viscosity (20° C.) | pH | S.T. (dyn/cm) | Viscosity (20° C.) | pH | S.T. (dyn/cm) | Microscopic observation | Aging stability |
| Example | | | | | | | | | |
| 1 | ⊚ | 2.8 cp | 9.2 | 41.1 | 2.7 cp | 9.1 | 44.0 | ⊚ | ⊚ |
| 2 | ⊚ | 2.5 | 6.3 | 42.1 | 2.7 | 9.7 | 45.1 | ⊚ | ⊚ |
| 3 | ⊚ | 3.3 | 9.5 | 47.7 | 3.1 | 9.2 | 44.7 | ⊚ | ⊚ |
| 4 | ⊚ | 3.2 | 8.5 | 41.9 | 3.4 | 8.3 | 41.3 | ⊚ | ⊚ |
| 5 | ⊚ | 2.5 | 9.3 | 42.6 | 2.3 | 8.9 | 42.4 | ⊚ | ⊚ |
| 6 | ⊚ | 2.4 | 9.3 | 43.6 | 2.4 | 8.9 | 41.3 | ⊚ | ⊚ |
| 7 | ⊚ | 2.0 | 6.1 | 42.3 | 1.9 | 6.0 | 40.1 | ⊚ | ⊚ |
| 8 | ⊚ | 3.7 | 11.1 | 40.2 | 3.4 | 9.9 | 40.8 | ⊚ | ⊚ |
| 9 | ⊚ | 2.5 | 8.5 | 43.7 | 2.5 | 8.2 | 45.2 | ⊚ | ⊚ |
| 10 | ⊚ | 2.3 | 9.9 | 45.2 | 2.0 | 9.2 | 49.0 | ⊚ | ⊚ |
| 11 | ⊚ | 3.1 | 9.1 | 35.0 | 3.2 | 9.0 | 33.1 | ○ | ○ |
| Comparative Example | | | | | | | | | |
| 1 | Δ | 2.9 | 9.5 | 46.4 | 3.0 | 9.3 | 46.2 | ○ | ○ |
| 2 | X | 2.4 | 8.6 | 46.8 | 2.4 | 8.4 | 50.0 | ○ | ○ |
| 3 | Δ | 3.2 | 10.5 | 47.5 | 3.2 | 10.2 | 46.1 | ○ | ○ |
| 4 | Δ | 2.5 | 9.6 | 51.6 | — | — | — | many deposits | X |
| 5 | ○ | 3.0 | 8.3 | 41.0 | — | — | — | many deposits | X |

The ink of the present invention is, as apparent from the aforementioned comparison tests, excellent in water-resistance on paper and aging resistance and suitable for inks for writing tools, plotter pens or ink jet printers.

Further variations and modifications of the foregoing will be apparent to those skilled in the art and are intended to be encompassed by the appended claims.

What is claimed is:

1. A water-resistant ink composition comprising:
(A) water,
(B) an anionic dye selected from the group consisting of C.I. Acid Yellow 40, C.I. Acid Orange 51, C.I. Acid Red 114 and 249, C.I. Acid Blue 83, 90, 103, and 127, C.I. Acid Green 25 and 27, C.I. Direct Black 154, and epoxydized C.I. Direct Black 154, and
(C) a water-resistance modifier which contains as an effective component at least one sparingly water-soluble compound containing at least one oleophilic group selected from an aromatic ring or an aliphatic hydrocarbon having 6–12 carbon atoms, and at least one hydrophilic group having at least one of O, N and S atoms;

wherein said sparingly water-soluble compound is a compound which is one or two of the compounds selected from the group consisting of (a) a compound having a dicarboxylate structure selected from bis(2,2,6,6-tetramethyl-4-piperidyl) sebacate or bis(1,2,2,6,6-pentamethyl-4-piperidyl)-sebacate;

(b) a compound having a benzophenone structure selected from benzophenone, 2,2'-dihydroxy-4-methoxybenzophenone, or 2,4-dihydroxy-benzophenone;

(c) a compound having a phenol structure selected from ethyl 2,2-bis(4'-hydroxyphenyl)propane gallate, n-propyl gallate, isoamyl gallate salicylic aidoxime, diethyl 4-hydroxy1,2-phthalate, or para-tert-butylphenol;

(d) benzimidazole;

(e) a compound having a benzothiazole structure selected from 2-chloro-benzothiazole, 2-methyl-5-chlorobenzothiazole, or 2-mercaptobenzothiazole;

(f) benzoin methyl ether; and (g) a compound having a benzoate structure selected from propyl p-hydroxybenzoate or phenyl benzoate.

2. A water-resistant ink composition according to claim 1 wherein said water-resistance modifier comprises an amount of a sparingly water-soluble compound, effective to improve the water-resistance of said dye on paper, which contains at least one oleophilic group selected from an aromatic ring or an aliphatic hydrocarbon having 6–12 carbon atoms and at least one hydrophilic group having at least one of O, N and S atoms and which has a solubility of 5% by weight or more in ethanol at 20° C.

3. A water-resistant ink composition according to claim 1, further comprising one or more dry-up resistance imparting agents selected from the group consisting of an alcohol, an amine, a urea compound, 2-pyrrolidone, polyvinyl pyrrolidone, sorbitol and diemthylsulfone.

4. A water-resistant ink composition according to claim 3, wherein said urea compound is a member selected from the group consisting of urea, thiourea, ethylene urea, hydroxyethylurea, ethylene thiourea, diethylthiourea and mixtures thereof.

5. The water resistant ink composition according to claim 1, wherein said sparingly water-soluble compound is a compound having a dicarboxylate structure selected from bis(2,2,6,6-tetramethyl-4-piperidyl) sebacate or bis(1,2,2,6,6-pentamethyl-4-piperidyl) sebacate.

6. The water resistant ink composition according to claim 1, wherein said sparingly water-soluble compound is a compound having a benzophenone structure selected from benzophenone, 2,2'-dihydroxy-4-methoxybenzophenone, or 2,4-dihydroxy-benzophenone.

7. The water resistant ink composition according to claim 1, wherein said sparingly water-soluble compound is a compound having a phenol structure selected from ethyl 2,2-bis(4'-hydroxyphenyl) propane gallate, n-propyl gallate, isoamyl gallate salicylic aidoxime, diethyl 4-hydroxy-1,2-phthalate, or para-tert-butylphenol.

8. The water resistant ink composition according to claim 1, wherein said sparingly water-soluble compound is benzimidazole.

9. The water resistant ink composition according to claim 1, wherein said sparingly water-soluble compound is a compound having a benzothiazole structure selected from 2-chloro-benzothiazole, 2-methyl-5-chlorobenzothiazole, or 2-mercaptobenzothiazole.

10. The water resistant ink composition according to claim 1, wherein said sparingly water-soluble compound is benzoin methyl ether.

11. The water resistant ink composition according to claim 1, wherein said sparingly water-soluble compound is a compound having a benzoate structure selected from propyl p-hydroxybenzoate or phenyl benzoate.

* * * * *